United States Patent
Schols et al.

(10) Patent No.: US 8,951,592 B2
(45) Date of Patent: Feb. 10, 2015

(54) PHYSICAL REFINING OF TRIGLYCERIDE OILS AND FATS

(71) Applicant: n.v. Desmet Ballestra Engineering s.a., Zaventem (BE)

(72) Inventors: Bart Schols, Hasselt (BE); Marcelo Usseglio, Buenos Aires (AR); Marc Kellens, Mechelen-Muizen (BE)

(73) Assignee: n.v. Desmet Ballestra Engineering s.a., Zaventem (BE)

( * ) Notice: Subject to any disclaimer, the term of this patent is extended or adjusted under 35 U.S.C. 154(b) by 0 days.

(21) Appl. No.: 13/869,468

(22) Filed: Apr. 24, 2013

(65) Prior Publication Data

US 2013/0287925 A1    Oct. 31, 2013

(30) Foreign Application Priority Data

Apr. 27, 2012    (GB) .................................. 1207321.9

(51) Int. Cl.
| | |
|---|---|
| C11B 3/14 | (2006.01) |
| C11C 1/10 | (2006.01) |
| A23D 9/04 | (2006.01) |
| B01D 3/38 | (2006.01) |
| A23D 9/00 | (2006.01) |
| B01D 3/14 | (2006.01) |

(52) U.S. Cl.
CPC ... *C11C 1/10* (2013.01); *A23D 9/04* (2013.01); *B01D 3/38* (2013.01); *C11B 3/14* (2013.01)
USPC .............................. 426/417; 202/153; 426/601

(58) Field of Classification Search
None
See application file for complete search history.

(56) References Cited

U.S. PATENT DOCUMENTS

| | | | | |
|---|---|---|---|---|
| 3,506,696 | A | * | 4/1970 | Baker et al. .................... 554/205 |
| 3,933,953 | A | * | 1/1976 | Leva ............................. 261/148 |
| 4,089,880 | A |   | 5/1978 | Sullivan |
| 4,297,112 | A | * | 10/1981 | Naylor ............................ 96/200 |
| 4,599,143 | A |   | 7/1986 | Stage |
| 4,698,185 | A |   | 10/1987 | Dijkstra et al. |
| 4,804,555 | A | * | 2/1989 | Marschner et al. ........... 426/601 |
| 4,996,072 | A | * | 2/1991 | Marschner et al. ........... 426/417 |
| 5,239,096 | A |   | 8/1993 | Rohdenburg et al. |
| 6,001,220 | A |   | 12/1999 | Hillstrom et al. |
| 6,750,359 | B1 |   | 6/2004 | Copeland et al. |
| 7,670,634 | B2 | * | 3/2010 | Kellens et al. ................. 426/488 |
| 7,722,832 | B2 | * | 5/2010 | Glover et al. .................. 422/504 |
| 7,892,335 | B2 | * | 2/2011 | Kellens et al. ................... 96/234 |
| 2002/0142083 | A1 |   | 10/2002 | Jacobs |
| 2004/0210070 | A1 |   | 10/2004 | Kruidenberg |
| 2005/0066823 | A1 |   | 3/2005 | Kellens et al. |
| 2008/0081097 | A1 | * | 4/2008 | Kellens et al. ................. 426/425 |
| 2010/0130610 | A1 | * | 5/2010 | Keller et al. ................... 514/560 |
| 2011/0220483 | A1 |   | 9/2011 | Margnat et al. |
| 2011/0281017 | A1 | * | 11/2011 | Brooker ......................... 426/630 |
| 2012/0245372 | A1 | * | 9/2012 | Galina et al. .................. 554/205 |

FOREIGN PATENT DOCUMENTS

| | | |
|---|---|---|
| DE | 3838932 C1 | 4/1990 |
| EP | 1 258 524 A1 | 11/2002 |
| EP | 1 905 815 A1 | 4/2008 |
| GB | 2 283 435 A | 5/1995 |
| WO | WO 88/02989 A1 | 5/1988 |

OTHER PUBLICATIONS

Athanassiadis, A., The Deacidification of Vegetable Oils by Distillation During Deodorization, Fat. Sci. Technol., vol. 90, pp. 522-526, May 1988.
Search Report Under Section 17(5) issued by the Intellectual Property Office in Britain mailed Aug. 20, 2012 for Application No. GB1207321.9 filed Apr. 27, 2012.
Search Report Under Section 17(6) issued by the Intellectual Property Office in Britain mailed Nov. 5, 2012 for Application No. GB1207321.9 filed Apr. 27, 2012.

* cited by examiner

*Primary Examiner* — Carolyn Paden
(74) *Attorney, Agent, or Firm* — Wegman, Hessler & Vanderburg

(57) ABSTRACT

A process for the physical refining of edible oils and fats, said process comprising three consecutive stages, whereby in a first stage at least 60% by weight of the volatiles are evaporated in a flash vessel, in a second stage some residual volatiles are evaporated by countercurrent steam stripping using a packed column (3), and in a third stage further residual volatiles are evaporated in a cross-flow tray system (2), wherein the pressure in said flash vessel is maintained at a value below the pressure prevailing above said packed column (3); and an apparatus for the physical refining of edible oils and fats comprising a flash vessel, a packed column (3), sparging trays (2) and the means to maintain the pressure in said flash vessel at a value that is below the pressure prevailing above said packed column.

18 Claims, 4 Drawing Sheets

PHYSICAL REFINING OF TRIGLYCERIDE OILS AND FATS

TECHNICAL FIELD OF THE INVENTION

The invention relates to the removal of free fatty acids and malodorous compounds from edible oils and fats.

BACKGROUND OF THE INVENTION

Crude edible oils and fats as obtained from oilseeds or oil-bearing fruits consist mainly of various triacylglycerols (triglycerides) but they also contain non-triglyceride components. Some of these are considered to be desirable such as the tocopherols that act as anti-oxidants and have vitamin E activity, but others such as free fatty acids, phospholipids and malodorous compounds have to be removed. For this purpose several refining processes have been developed. Degumming processes aim at removing phospholipids from the crude oil; bleaching processes aim at removing residual phospholipids and colouring matter by treating the oil with an adsorbent, and high-temperature vacuum stripping processes aim at removing crude oil constituents that are less volatile than the triglycerides.

In this context, a distinction must be made between commodity oils such as but not limited to soya bean oil, palm oil, rapeseed oil, and sunflower seed oil, on the one hand, and speciality oils and fats such as but not limited cocoa butter, olive oil, various cold pressed oils, and gourmet oils in general on the other. Whereas commodity oils should be bland and almost colourless, speciality oils and gourmet oils in general should reflect their agricultural origin and may therefore have a characteristic colour and/or flavour that should be retained during refining.

Another distinction to be made concerns the manner in which the free fatty acids are removed from the crude oil. In the chemical refining process, the free fatty acids (FFA) are removed by making them react with sodium hydroxide when treating the crude oil with caustic soda (lye). This converts the FFA into soaps that can be separated from the oil by using a centrifugal separator. A disadvantage of this process is that the soap phase entrains a fair amount of neutral oil, which constitutes a refining yield loss. Another disadvantage is that the acidulation of the soap phase leads to an aqueous effluent with a high sulphate and phosphate content and a high chemical oxygen demand. Accordingly, the physical refining process, in which the FFA are removed as such by volatilization during a high-temperature vacuum stripping process is gradually replacing the chemical refining process.

Because the neutral oil loss during chemical refining is almost proportional to the FFA-content of the crude oil, the advantages of the physical refining process over the chemical refining process are most pronounced for high-FFA oils such as palm oil. Crude palm oil has a low phospholipid content, which means that these contaminants can be effectively removed in the so-called dry degumming process as disclosed in U.S. Pat. No. 4,089,880. In this process, the crude oil is treated with a degumming acid such as phosphoric acid. This acid decomposes the so-called non-hydratable phosphatides (NHP) present in crude oil, so that they can subsequently be removed by adsorption onto bleaching earth. This bleaching earth also removes colouring compounds. Accordingly, applying the dry degumming process and the physical refining process provides a simple purification process for low-phosphatide oils like palm oil, lauric oils like palm kernel oil and coconut oil and animal fats like lard and tallow. It has the advantages of consisting of only two steps and low neutral oil entrainment and hence giving a high yield.

Since those skilled in the art firmly believe that physical refining can only be applied to oils with a low (<3 ppm P) phosphatide content, the advent of effective degumming processes for seed oils, such as the acid refining processes disclosed in U.S. Pat. No. 4,698,185 and U.S. Pat. No. 5,239,096, meant that seed oils also became amenable to physical refining. This started with medium-FFA oils such as sunflower seed oil and rapeseed oil, but its use gradually spread to low-FFA oils such as soya bean oil, because the scale of refinery operations had evolved to such high capacity plants that even a relatively small process improvement led to large absolute savings. These improvements not only relate to oil yield but in the case of vacuum stripping also to energy and steam requirements and by-product valorization.

In respect of energy savings much progress has been made in continuous deodorisers by the introduction of countercurrent heat exchangers. As disclosed in U.S. Pat. No. 6,001,220, stripping steam requirements have been reduced by the introduction of packed columns that allow countercurrent steam stripping. Using less stripping steam also means that less motive steam is required in the steam ejectors or, if a mechanical vacuum pump is used to maintain the vacuum, less electrical energy is required.

Packed columns have a disadvantage in that they present a resistance to the vapour flow which results in a pressure drop over the column. Thus, if the oil to be deodorised or physically refined is first allowed to trickle down a packed column before being further steam stripped in the deodorisation trays below said column, the pressure above these trays will be substantially higher than the pressure above said column. Since in steam stripping the steam requirement is proportional to the absolute pressure, the steam savings resulting from the use of a column are to a large extent lost because of the increased steam requirements of the trays.

US 2005-066823A1 provided a solution to this problem by disclosing a vacuum stripping process for the physical refining or deodorization of a liquid material, the process being performed in an apparatus comprising at least a first stripping vessel being supplied with said liquid material to be vacuum stripped and also being supplied with a gaseous stripping medium by a single pump that obtains this gaseous stripping medium from at least one further downstream second stripping vessel, the at least one second stripping vessel being equipped with two or more trays, over which a partially stripped material coming from the first stripping vessel is directed, wherein said partially stripped material on each of these trays is sparged with fresh gaseous stripping medium and said gaseous stripping medium is collected from above each tray of the at least one second stripping vessel by means of the pump. An additional pump is thereby provided that draws vapours from above the trays, compresses these vapours, and feeds the compressed vapours below the packed column resulting in the pressure above the trays being reduced so that they require less stripping steam to achieve the same degree of volatile removal.

Improvements have also been made with respect to the valorisation of by-products. In deodorisation and physical refining it is customary to pass the vapours leaving the oil through a vapour scrubber and condense the organics. These organics are a mixture of different compounds comprising free fatty acids, tocopherols, non-esterified sterols, malodorous compounds and various compounds that are specific for the agricultural origin of the oil being processed. As only to be expected, the FFA content of this mixture depends strongly on the FFA content of the oil that is going to be stripped under vacuum. When this oil has a high FFA content of say 5%, the FFA content of the condensate may be as high as 90% or even higher but when a neutral oil is deodorised the amount of condensate is much smaller and its FFA content is lower as well.

Since the value of this condensate in the market depends on its purity, processes have been developed to isolate high-value components from this condensate, such as for instance tocotrienol compounds as disclosed in US 2002/0142083A. U.S. Pat. No. 6,750,359B1 discloses a process for isolating components from a vaporized distillate, comprising: (a) introducing a vaporized distillate comprising sterols, tocopherols, and fatty acids into a first condensing zone of a condensing unit having at least two condensing zones and operating at a pressure of less than about 10 mm Hg, the first condensing zone operating at a temperature of from about 330 to about 450° F. (about 165.6 to 232.2° C.); (b) condensing a first fraction of the vaporized distillate in the first condensing zone to produce a first condensate enriched in sterols and tocopherols, leaving a remaining fraction of vaporized distillate; (c) introducing the remaining fraction of vaporized distillate into a second condensing zone of the condensing unit, the second condensing zone operating at a temperature of from about 100 to about 170° F. (about 37.8 to about 76.7° C.); and (d) condensing a second fraction of the remaining fraction of vaporized distillate in the second condensing zone to produce a second condensate enriched in fatty acids, leaving a waste vapor. Such fractional condensation using two scrubbers operating at different temperatures as disclosed in U.S. Pat. No. 6,750,359B1 can also lead to purer condensates with increased market value.

Instead of fractional condensation, a fractional evaporation has also been suggested. In 1988, A. Athanassiadis in a paper entitled "The deacidification of vegetable oils by distillation during deodorization" published in Fat. Sci. Technol., volume 90, pages 522-526, suggested a separate deacidifier preceding a standard tray deodoriser. Three types of deacidifier are shown in this paper: a tube and shell type in which the oil can be heated when flowing down the tube walls, a packed column that requires the oil to be pre-heated, and a column with superimposed stages. Stripping medium is supplied to all three types and the vacuum in the deacidifiers is the same as in the deodorisers.

U.S. Pat. No. 4,599,143 discloses a process for removing lower boiling components from at least one liquid member selected from the group of high-boiling, organic, edible oils; high-boiling, organic, edible fats; high-boiling, organic, edible esters; or mixtures thereof; employing continuous countercurrent falling film stripping steam distillation in an externally imposed termperature field, which comprises heating said liquid member to 220° to 280° C. at a working pressure between 2 and 10 mbar, causing said liquid member at 220° to 280° C. and said working pressure to flow down as a thin film having a film thickness of less than 1.0 mm at the wall of substantially vertically arranged surfaces forming trickle passages maintaining at least a part of said passages at a higher temperature than the downflowing liquid, and passing a vapor of a low-molecular weight liquid countercurrently to said liquid through said trickle passages; which comprises providing at least two countercurrent falling film stripping steam distillation zones operating in series and being in vapor and liquid communication with each other and providing an unrestricted vapor flow connection and wherein the hydraulic equivalent diameters of the trickle passages in the final distillation zone downstream in the direction of the downflowing liquid are smaller than the hydraulic equivalent diameters of the trickle passages of the initial zone(s) located upstream of said final distillation zone; and supplying stripping steam exclusively to the bottom of said final distillation zone. In a preferred embodiment of the process disclosed in U.S. Pat. No. 4,599,143, the liquid to be treated has a relatively high proportion of free fatty acids and other low-boiling components, and the process further comprises carrying out a flash treatment immediately before entry into the initial distillation zone, and wherein said flash treatment is conducted at substantially the same working pressure as in the initial zone; and separating and condensing the vapors released upon the flashing. The stripping steam supplied below the second falling film column passes also through the tubes of the first falling film column but does not pass through the flash vessel. Instead, it passes immediately to a scrubber.

US 2005-066823A1, in a preferred embodiment, also discloses that the liquid material to be vacuum stripped be exposed to vacuum in a flashing vessel before being vacuum stripped in the first stripping vessel. The vessel can be outside or inside the deodoriser shell and no stripping medium is supplied to this vessel. The pressure inside the vessel is the same as above the packed column used for the countercurrent vacuum stripping treatment since the vapours leaving the flash vessel and those leaving the packed column enter a communal vacuum system through the same scrubber.

US 2004-0210070A1 discloses a vegetable oil processing system, comprising: a deodorizer having a first deodorizer segment and a second deodorizer segment, the first and second deodorizer segments being maintained at an elevated temperature; a first vapor outlet in fluid communication with the first deodorizer segment and positioned to receive a first vapor stream comprising a majority of first volatiles from the first deodorizer segment; a second vapor outlet in fluid communication with the second deodorizer segment and positioned to receive a second vapor stream which comprises second volatiles from the second deodorizer segment; a first recovery system in fluid communication with the first vapor outlet and adapted to cool the first vapor stream to preferentially condense a first recovered fluid and direct a remaining first byproduct stream outwardly through a first byproduct outlet; a second recovery system in fluid communication with the second vapor outlet and adapted to cool the second vapor stream to preferentially condense a second recovered fluid and direct a remaining second byproduct stream outwardly through a second byproduct outlet; a common byproduct condenser in fluid communication with the first and second byproduct outlets, the byproduct condenser being maintained at a pressure of no greater than 10 mm Hg and being adapted to condense a substantial fraction of the first and second volatiles remaining in the first and second byproduct streams; and a common vacuum system in fluid communication with and adapted to maintain pressures in the first and second deodorizer segments, the first and second recovery systems, and the common byproduct condenser at a pressure no greater than 10 mm Hg. This system also has a common vacuum system but instead of a single scrubber, it comprises several different scrubbers. One of these scrubbers is connected to the central chimney that is surrounded by deodorisation trays. Another separate scrubber is connected to the first tray that is used to heat the oil to deodorisation temperature. Since these scrubbers are separate, their condensates can also be kept separate. Because the different scrubbers are connected to the common vacuum system, they operate at the same pressure.

SUMMARY OF THE INVENTION

It is therefore an object of the invention to provide an apparatus for the physical refining of edible oils and fats capable of providing an improved oil yield over prior art apparatuses and a physical refining process for edible oils and fats with an improved oil yield over prior art processes.

It is an advantage of the apparatus for the physical refining of edible oils and fats and the physical refining process of the present invention that they are respectively capable of yielding and yield a fatty acid condensate with an FFA content that is higher than that obtained in conventional apparatuses and processes.

It is also an advantage of the apparatus for the physical refining of edible oils and fats and the physical refining process of the present invention that they are respectively capable of reducing and reduce stripping steam requirements and thereby also save on motive steam driving the steam ejectors or on electricity when mechanical vacuum pumps are used.

It is a further advantage of the apparatus for the physical refining of edible oils and fats and the physical refining process of the present invention that they are respectively capable of yielding separate condensate streams with different compositions.

It has surprisingly been found that the above object and advantages are realised by a process for the physical refining of edible oils and fats and an apparatus for the physical refining of edible oils and fats according to the present invention. The process according to the present invention can be used for the physical refining of both low and high FFA oils by producing a separate fatty acid distillate (FAD 1) stream in case of high FFA oils in an apparatus that has a reduced diameter for the countercurrent stripping and the scrubbing stages. It can be used to produce a high FFA stream by dual temperature condensation and it leads to a high oil yield by the at least partial recycling of the FAD 2 stream.

In a first aspect of the present invention a process for the physical refining of edible oils and fats is realised, the process comprising three consecutive stages, whereby in a first stage at least 60% by weight of the volatiles are evaporated in a flash vessel, in a second stage some residual volatiles are evaporated by countercurrent steam stripping using a packed column (3), and in a third stage further residual volatiles are evaporated in a cross-flow tray system (2), wherein the pressure in said flash vessel is maintained at a value below the pressure prevailing above said packed column.

In a second aspect of the present invention an apparatus for the physical refining of edible oils and fats is realised, the apparatus comprising a flash vessel, a packed column (3) and sparging trays (2) and a means to maintain the pressure in the flash vessel at a value that is below that prevailing above the packed column.

In a third aspect of the present invention a condensate with a high FFA content is realised resulting from the condensation of the vapours resulting from said first stage according to the first and second aspects of the present invention.

In a fourth aspect of the present invention a condensate with low FFA content and increased tocopherol content is realised resulting from the high temperature scrubbing of the vapours resulting from said second and/or third stages according to the first and second aspects of the present invention.

Particular and preferred aspects of the invention are set out in the accompanying independent and dependent claims. Features from the dependent claims may be combined with features of the independent claims and with features of other dependent claims as appropriate and not merely as explicitly set out in the claims.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference numbers and letters quoted below refer to the attached drawings.

BRIEF DESCRIPTION OF THE DRAWINGS

In the different figures, the same reference numbers and letters to the same or analogous elements.

DETAILED DESCRIPTION OF THE INVENTION

Figure 1:
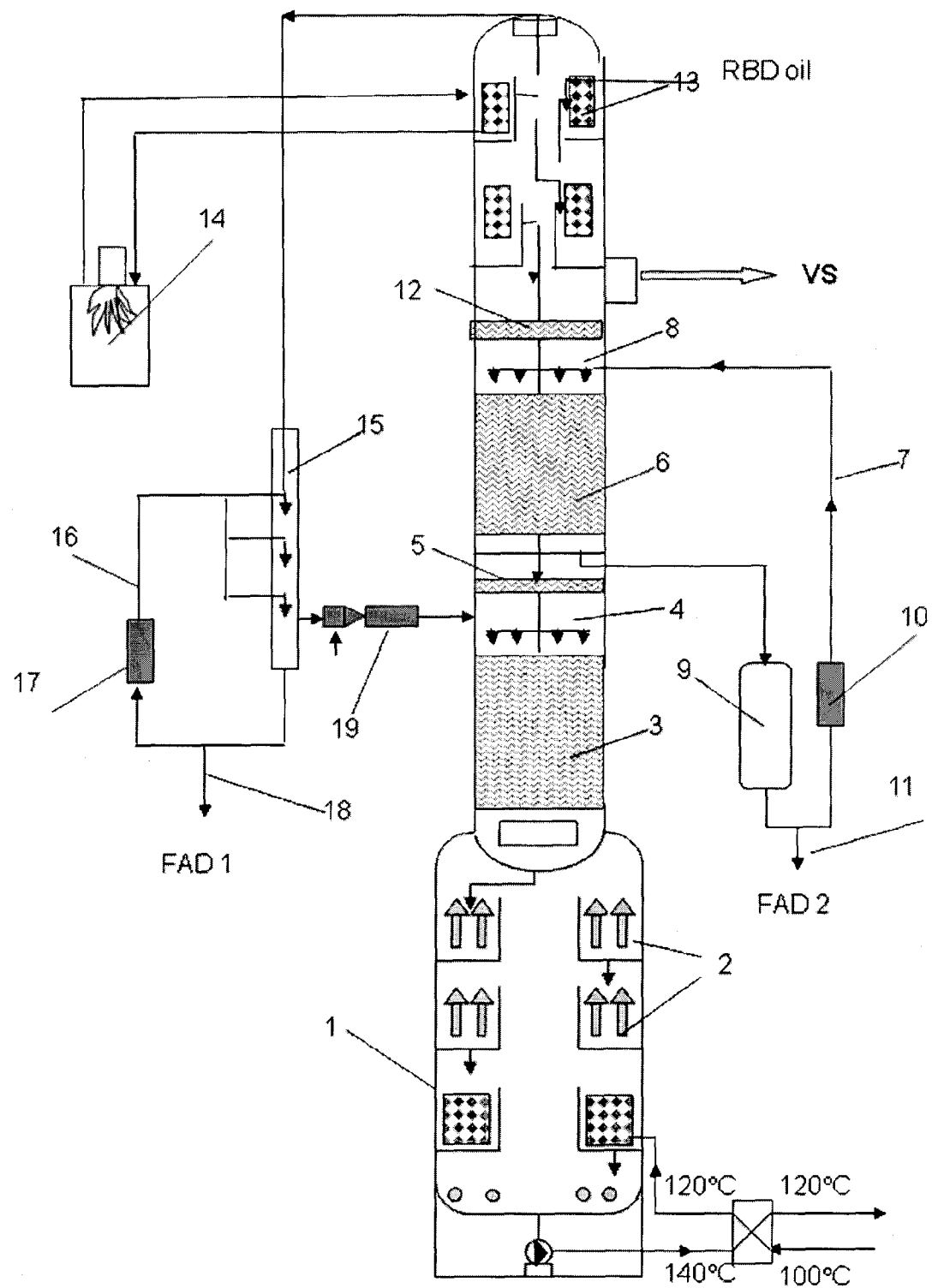
FIG. 1 is a schematic view of a preferred embodiment of the process and apparatus of the present invention, where VS represents vacuum system.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

The meaning of the word "comprising" encompasses all the specifically mentioned features as well as optional, additional, unspecified ones, whereas the term "consisting of" only includes those features as specified in the claim. Therefore, "comprising" includes the term "consisting of", so that the amendment from the former into the latter term does not extend beyond the content of the application as originally filed.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practised without these specific details. In other instances, well-known methods, structures and techniques have not been shown in detail in order not to obscure an understanding of this description.

The following terms are provided solely to aid in the understanding of the invention.

DEFINITIONS

The term edible commodity oil, as used in disclosing the present invention, means a non-specialty oil, a specialty oil being characterised by its retaining the qualities of colour and flavour normally associated with the oil. Edible commodity oils include oils selected from the group consisting of palm oil, soya bean oil, cottonseed oil, groundnut oil, sunflower seed oil, rapeseed oil, corn oil, palm kernel oil, coconut oil, canola oil, rice bran oil and flaxseed oil.

The term edible commodity fat, as used in disclosing the present invention, means a non-specialty fat, a specialty fat being characterised by its retaining the qualities of colour and flavour normally associated with the fat. Edible commodity fats include cocoa butter, tallow and lard.

The term speciality oil, as used in disclosing the present invention, means cold-pressed oils, fruit oils (e.g., avocado oil), tree nut oils (e.g., walnut oil, pecan nut oil and hazelnut oil), fruit stone oils (e.g., almond oil, cherry stone oil and plum stone oil) and oils derived from special cultivars of commodity oil seeds (e.g., high oleic sunflower seed oil, high oleic safflower seed oil) oils rich in α-linolenic acid (e.g., flax seed oil, perilla seed oil and camelina seed oil, hempseed oil), oils rich in γ-linolenic acid (e.g., borage oil, evening primrose oil blackcurrent pip oil, berry seed and grapeseed oils, sesame seed oil, niger seed oil, black cumin seed oil, tobacco seed and tea seed oil, tomato seed oil, pumpkin seed oil, and germ oils (e.g., wheat germ oil, rapeseed germ oil, oat germ oil, and barley germ oil).

Speciality oils include oils selected from the group consisting of aceituno oil, almond oil, amaranth oil, apricot kernel oil, avocado oil, babassu oil, barley germ oil, blackcurrant pip oil, black cumin seed oil, borage oil, borneo tallow, buffalo gourd oil, calendula oil, camelina seed oil, caraway seed oil, carrot seed oil, cashew oil, cherry stone oil, chia seed oil, Chinese tallow, coriander seed oil, crambe oil, cuphea oil, dimorphotheca oil, evening primrose oil, flax seed oil, grapeseed oil, hazelnut oil, hemp seed oil, honesty seed oil, illipe butter, kapok oil, kokum butter, lesquerella oil, macadamia nut oil, mahua oil, mango kernel oil, meadowfoam seed oil, melon seed oil, mowrah butter, mustard seed oil, neem seed oil, niger seed oil, nutmeg oil, oiticica oil, oat germ oil, olive oil, onion seed oil, parsley seed oil, passion fruit oil, pecan nut oil, perilla seed oil, pistachio nut oil, plum stone oil, poppy seed oil, pumpkin seed oil, purslane oil, rapeseed germ oil, safflower oil, sal fat, sea buckthorn oil, sesame seed oil, shea butter, tea seed oil, tobacco seed oil, tomato seed oil, tung oil, walnut oil, wheatgerm oil, high oleic sunflower oil, high oleic safflower oil and high linoleic safflower oil.

The term "Vitamin E" refers to a family of eight molecules having a chromanol ring (chroman ring with an alcoholic hydroxyl group) and a 12-carbon aliphatic side chain containing two methyl groups in the middle and two more methyl groups at the end: four tocopherols and four tocotrienols. Such compounds have vitamin E activity.

The term volatiles, as used in disclosing the present invention, means components or mixtures more volatile than diglycerides.

A flash vessel, as used in disclosing the present invention, is a vessel inside which a low pressure is maintained, so that when heated, bleached oil containing volatiles is introduced into this vessel, part of the volatiles are evaporated. For example, oil at a particular pressure is fed into a vessel at a lower pressure resulting in volatilization of constituents thereof.

FFA, as used in disclosing the present invention, is an abbreviation of "free fatty acid".

FAD, as used in disclosing the present invention, is an abbreviation of "fatty acid distillate".

NHP, as used in disclosing the present invention, is an abbreviation for "non-hydratable phosphatides".

RBD oil, as used in disclosing the present invention, is an abbreviation of "refined, bleached and deodorized oil".

RB oil, as used in disclosing the present invention, is an abbreviation of "refined and bleached oil".

TOD, as used in disclosing the present invention, is an abbreviation of "tocopherol distillate".

MG, as used in disclosing the present invention, is an abbreviation of "monoglyceride".

DG, as used in disclosing the present invention, is an abbreviation of "diglyceride".

TG, as used in disclosing the present invention, is an abbreviation of "triglyceride".

The invention will now be described by a detailed description of several embodiments of the invention. It is clear that other embodiments of the invention can be configured according to the knowledge of persons skilled in the art without departing from the true spirit or technical teaching of the invention, the invention being limited only by the terms of the appended claims.

It is to be understood that although preferred embodiments, specific constructions and configurations, as well as materials, have been discussed herein for apparatuses according to the present invention, various changes or modifications in form and detail may be made without departing from the scope and spirit of this invention. Functionality may be added or deleted from the block diagrams and operations may be interchanged among functional blocks. Steps may be added or deleted to methods described within the scope of the present invention.

Process for the Physical Refining of Edible Oils and Fats

In a first aspect of the present invention a process for the physical refining of edible oils and fats is realised, the process comprising three consecutive stages, whereby in a first stage at least 60% by weight of the volatiles are evaporated in a flash vessel, in a second stage some residual volatiles are evaporated by countercurrent steam stripping using a packed column (3), and in a third stage further residual volatiles are evaporated in a cross-flow tray system (2), wherein the pressure in the flash vessel is maintained at a value below the pressure prevailing above the packed column.

According to a preferred embodiment of the first aspect of the present invention, the edible oils and fats comprise at least 0.5% by weight of volatiles with at least 1.0% by weight being preferred and at least 2.0% by weight being particularly preferred.

According to another preferred embodiment of the first aspect of the present invention, at least 80% by weight of the volatiles are removed in the first stage of the process.

The process can be used continuously and semi-continuously but its advantages are most pronounced in the continuous process.

According to another preferred embodiment of the first aspect of the present invention, the process is a continuous process.

According to another preferred embodiment of the first aspect of the present invention, the process is a semi-continuous process.

The process according to the present invention is eminently suitable for the large scale physical refining of high-acidity oils such as palm oil when its advantages of a high refined oil yield and a high FFA content of the fatty acid distillate become clearly apparent.

The process can also be profitably used for medium-acidity seed oils such as sunflower seed oil and rapeseed oil and the apparatus capable of executing the process according to the invention can also be used for low-acidity oils by bypassing certain unit operations. This makes the process according to the invention extremely versatile.

According to another preferred embodiment of the first aspect of the present invention, the edible oils and fats are commodity oils and fats.

The oils and fats to be treated in the process according to the present invention should be of standard quality. This means that they should have been degummed to a residual phosphorus content below 10 ppm P or preferably below 5 ppm P. Subsequently, the oils should have been bleached and deaerated before being subjected to the flash evaporation stage of the process according to the present invention. Standard bleaching techniques can be used for this purpose. When the oil to be treated by the process according to the present invention contains polyaromatic hydrocarbons and/or pesticide residues, these should preferably be removed by an activated carbon treatment as known to those skilled in the art. This is especially important when the distillate into which these impurities are to be concentrated is destined for outside sale.

Since the heat of evaporation of fatty acids is about 90 kJ/mol and the specific heat of the oil at 260° C. is about 2.6 kJ/kg° C., this means that the adiabatic evaporative removal of 4% FFA would decrease the oil temperature by approximately 5° C. This temperature drop must be compensated for and the process according to the first aspect of the present invention provides several embodiments for this purpose.

According to another preferred embodiment of the first aspect of the present invention, the oil is superheated before it enters the flash vessel. Upon entering the flash vessel, the evaporation of the free fatty acid occurs and as a result the oil cools down at the same time. However, superheating the oil may be unacceptable on oil quality grounds.

According to another preferred embodiment of the first aspect of the present invention, the oil is allowed to cool down during the flashing stage, after which an intermediate re-heating stage may be provided.

According to another preferred embodiment of the first aspect of the present invention, the oil temperature during the first flashing stage is between 220 and 280° C.

According to another preferred embodiment of the first aspect of the present invention, the flash evaporation is carried out adiabatically by superheating the oil or fat to be physically refined and passing the resulting superheated oil to said flash vessel.

According to another preferred embodiment of the first aspect of the present invention, the oil leaving said flash vessel (23) is re-heated in heating trays (13) before being distributed over said packed column (3) in said second stage.

According to another embodiment of the first aspect of the present invention, heat is transferred to the oil during the flashing stage i.e., while vapours are flashed off, preferably using upper trays (13) as the flash vessel with its heat exchange elements being used to transfer heat to the incoming oil and thereby controlling the temperature of the oil fed to the second stage preferably with either heat transfer in the upper trays (13) being promoted by supplying sparging steam to the upper trays, or no sparging steam being applied to the upper trays (13). This heat transfer may be effected by the heat exchange elements in trays (13). In the embodiment of the present invention comprising an intermediate re-heating the oil after flashing, trays (13) are used for just reheating the oil; in that instance, the use of sparging steam in trays (13) may be imperative to attain an acceptably high rate of heat transfer. In this embodiment, the flashing stage is carried out at relatively low temperatures. This has the potential advantage that the vapours generated during the flashing stage have a higher FFA content than when the flashing is carried out at a higher temperature and thus leads to a fatty acid distillate with a high FFA content, which may command a higher price. Because the FFA vapour pressure decreases when the temperature is lowered, care should be taken in this embodiment to maintain a sufficiently low pressure in the flash vessel.

According to another preferred embodiment of the first aspect of the present invention, the vapours produced during said first stage are fractionated by successive condensation at increasingly lower temperatures.

According to another preferred embodiment of the first aspect of the present invention, the vapours produced during said second and third stages are fractionated by successive condensation at increasingly lower temperatures.

According to another preferred embodiment of the first aspect of the present invention, the condensate of the vapours resulting from said first stage is combined with the condensate of the vapours that result from subsequent stages.

According to another preferred embodiment of the first aspect of the present invention, the low-temperature condensate produced in scrubber (6B) from the vapours generated in the second and third stages is at least partially recycled to the oil to be physically refined.

According to another preferred embodiment of the first aspect of the present invention, the pressure in said flash vessel (13) is reduced by pump (19) that extracts vapour from said vessel and feeds the extracted vapour into shell (1) above packed column (3) and below scrubber (6), with said pump being preferably a steam ejector or preferably being a mechanical pump.

According to another preferred embodiment of the first aspect of the present invention, the pressure in said flash vessel (13) is reduced by pump (20) that extracts vapour from said vessel and also from the space above trays (2) and feeds the extracted vapour into shell (1) below said packed column (3), the pump being preferably a steam ejector so that the motive steam supplied to said steam ejector at least partially replaces the stripping medium used in said column (3).

According to another preferred embodiment of the first aspect of the present invention, the pressure in said flash vessel (13) is reduced by steam ejector (21) that extracts vapour from said vessel and forwards the extracted vapour below packed column (3) so that the motive steam supplied to said steam ejector at least partially replaces the stripping medium used in said column (3) and the stripping steam used to sparge trays (2) bypasses said column (3) and moves directly below scrubber (6).

Figure 2:
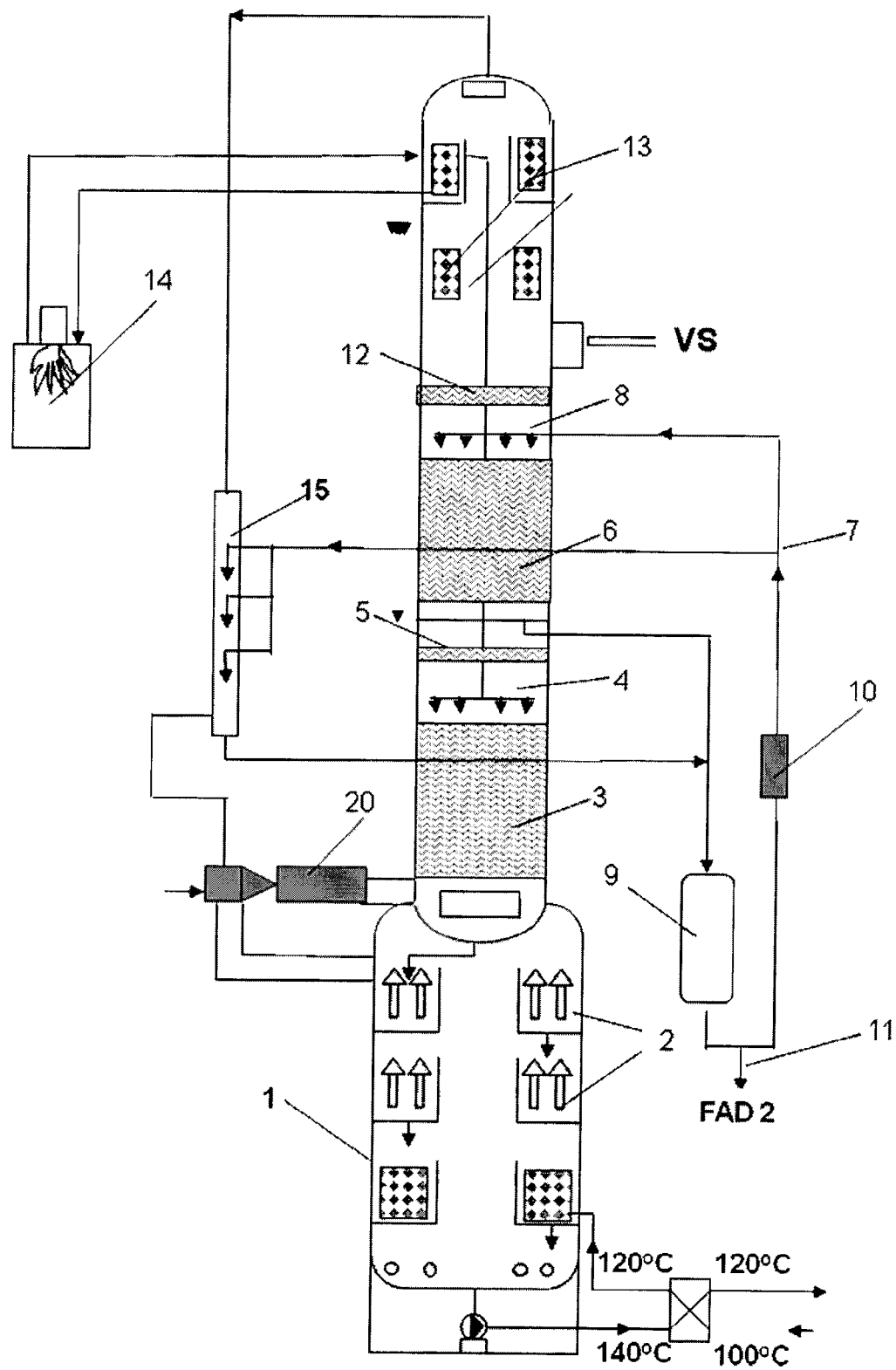
FIG. 2 is a schematic representation of another preferred embodiment of the process and apparatus of the present invention.

The preferred embodiment of the first and second aspect of the present invention shown in FIG. 2 also illustrates another aspect of the process of the first aspect of the invention, which concerns scrubber (15). Whereas in the preferred embodiment of the first and second aspect of the present invention depicted in FIG. 1 this scrubber had its own circuit (16) and its own purge (18), in the preferred embodiment of the second aspect of the present invention shown in FIG. 2 scrubber (15) shares its circuit with circuit (7) of scrubber (6). Consequently, the embodiment depicted in FIG. 2 leads to a single, combined FAD at purge valve (11).

Figure 3:
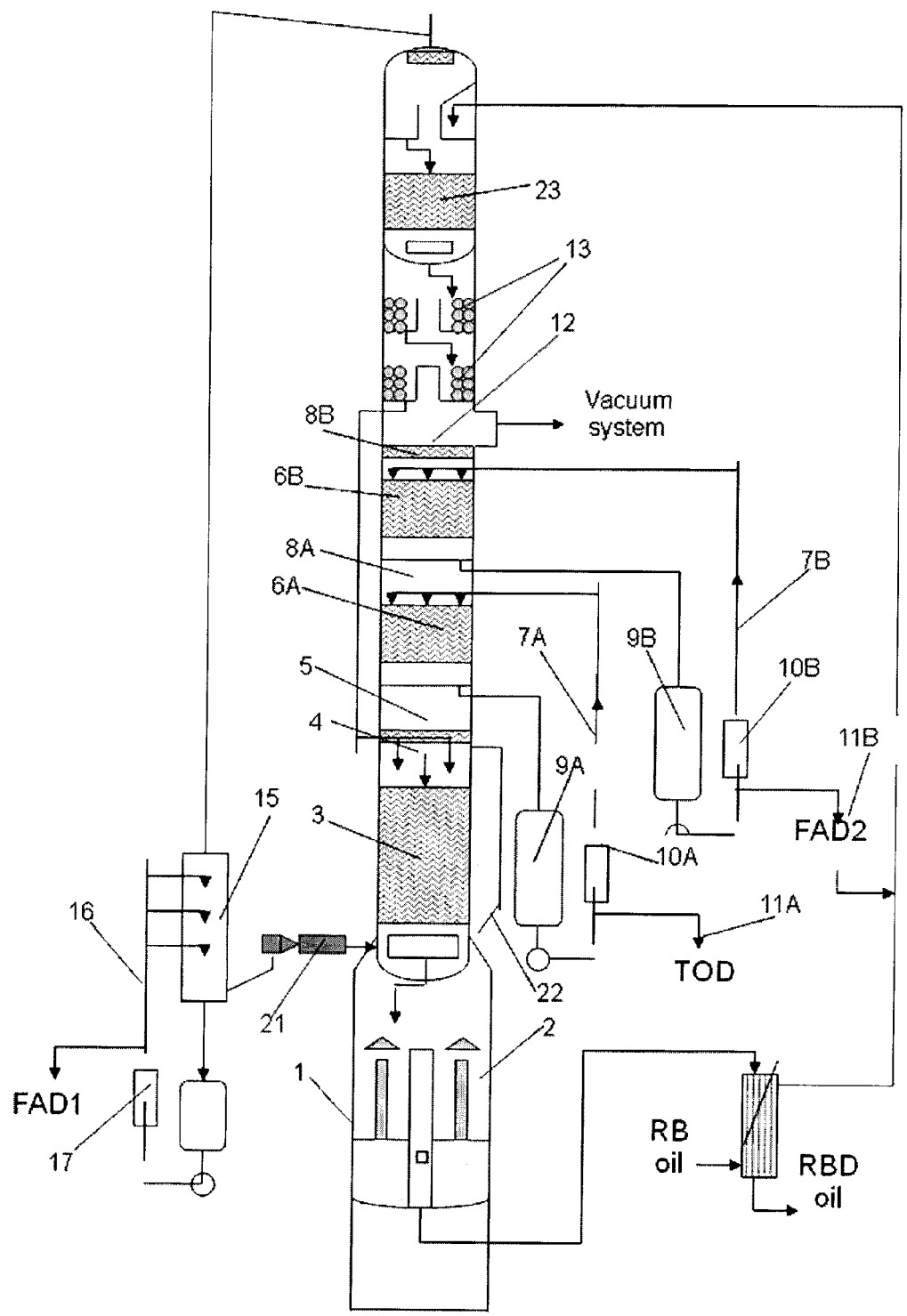
FIG. 3 is a schematic representation of yet another preferred embodiment of the process and apparatus of the present invention.

In the embodiment of the first aspect of the present invention shown in FIG. 3, a first condensation temperature of 140° C. to 160° C. leads to a first condensate (11A), which in FIG. 3 has been indicated as TOD (tocopherol distillate). Because of its composition, this condensate may command an attractive market price and be sold as such. A second condensation at 50° C. to 65° C. leads to a second condensate (11B) with a higher FFA content and a lower tocopherol content. In the embodiment shown in FIG. 3, this condensate (referred to as FAD2) is recycled. Accordingly, the product streams originating from the embodiment of the first aspect of the present invention shown in FIG. 3 are RBD (refined, bleached and deodorised) oil, FAD1, a high-FFA condensate and the TOD-stream that can be sold as such. Because of the composition of both condensates, the oil yield has been maximised.

The TOD-stream produced by the process according to the first aspect of the present invention has clear advantages over prior art tocopherol concentrates. These concentrates tend to be produced by fractional distillation of deodoriser condensates in which the less volatile tocopherols are concentrated in the still bottoms. Accordingly, they tend to be coloured and far less clear than the TOD-distillate stream realised by the fourth aspect of the present invention.

When to opt for which embodiment of the process according to the invention depends on a number of factors, several of which can be governed by local circumstances. If an FAD with a very high FFA content is aimed for, the FAD 1 should be kept separate from the FAD 2 as shown in the embodiment of the process of the first aspect of the present invention depicted in FIG. 1. Moreover, the amount of stripping medium that is used in flash tray (13) should be minimised and preferably reduced to zero. When oil with an FFA content of, for instance, 4% is fed to flash tray (13), the oil temperature and the system pressure at that location may cause so much FFA to be flashed off that the residual FFA content of the oil moving to stage two of the process according to the present invention may have been reduced to 0.5%. The FFA vapour volume resulting from this flashing stage is considerable and will therefore also cause some higher boiling volatiles to evaporate at the same time. If sparging steam were to be supplied to tray (13), an amount of 0.23 wt % sparging steam will occupy the same volume as the 3.5 wt % FFA that has been flashed off. This stripping steam will remove some further FFA but that amount will be relatively small, whereas the amount of other, less volatile constituents (said high-boiling volatiles) will be almost proportional to the vapour volume.

Therefore, by collecting FAD 1 separately and minimising the sparging steam in tray (13), the process according to the invention allows an FAD with a high FFA content to be produced. This does not only have the advantage that this particular FAD commands a higher price than when its FFA contents was less high, it also has the advantage that its high FFA content implies a low non-FFA content and thus a low yield loss and thus a high oil yield.

In order to further improve the yield of the process according to the present invention, the FAD 2 stream can be at least partially recycled and reprocessed in the process according to the present invention. It can be recycled to any previous stage but since it has already been distilled and will have a low colour, it is most logical to recycle this stream to the intermediate storage of the bleached oil that is to be processed according to the invention.

This at least partial recycling will lead to a steady state with respect to the concentration of the high-boiling volatiles in the various product streams. By the recycling of at least part of FAD 2, said concentration will increase in the oil entering flash tray (13). Consequently, the vapours entering scrubber (15) will have an increased concentration of high-boiling volatiles so that the FAD 1 will also face a higher content of said high-boiling volatiles. How much higher depends on the performance of the equipment and the fraction of FAD 2 being recycled.

Apparatus for the Physical Refining of Edible Oils and Fats

In a second aspect of the present invention an apparatus for the physical refining of edible oils and fats is realised, the apparatus comprising a flash vessel, a packed column (3) and sparging trays (2) and a means to maintain the pressure in the flash vessel at a value that is below that prevailing above the packed column.

According to an embodiment of the second aspect of the present invention, the apparatus is capable of executing the process according to the present invention.

The apparatus of the present invention can also be used for low-acidity oils by bypassing certain unit operations.

The apparatus according to the present invention is a deodoriser that has several standard features and also some special features that will now be discussed in more detail with reference to the figures. The deodoriser consists of a shell (1) that may have a wide diameter at its lower part to accommodate the superimposed trays (2). Since the flash evaporation of the process according to the present invention reduces the load on packed column (3) and scrubber (6), the diameter at the upper part of the deodoriser containing said column and said scrubber can be smaller, which reduces the cost of construction. However, the relative magnitude of the diameters is not a critical aspect of the apparatus according to the present invention. The upper part of the apparatus contains a packed column (3) that allows the countercurrent stripping of the second stage of the process according to the invention to be carried out.

According to another preferred embodiment of the second aspect of the present invention, the means to maintain the pressure in said flash vessel at a value that is below the pressure prevailing above said packed column consists of a pump (19) that collects vapour from said flash vessel and feeds the extracted vapour above said packed column and below said scrubber into shell (1) containing said packed column (3) and scrubber (6), the pump (19) preferably being a mechanical pump or preferably being a steam ejector.

According to another preferred embodiment of the second aspect of the present invention, the means to maintain the pressure in said flash vessel at a value that is below the pressure prevailing above said packed column consists of a pump (20) that extracts vapour from said flash vessel and also from the space above trays (2) and feeds the extracted vapour into shell (1) below said packed column (3), said pump (20) being preferably a steam ejector so that the motive steam supplied to said steam ejector at least partially replaces the stripping medium used in said column (3).

According to another preferred embodiment of the second aspect of the present invention, the means to maintain the pressure in said flash vessel at a value that is below the pressure prevailing above said packed column consists of a steam ejector (21) that extracts vapour from said vessel and forwards the extracted vapour below packed column (3) so that the motive steam supplied to said steam ejector at least partially replaces the stripping medium used in said column (3) and a conduit (22) allowing the stripping steam used to sparge trays (2) to bypasses said column (3) and move directly below scrubber (6).

In the preferred embodiment of the second aspect of the present invention shown in FIG. 1, the stripping medium for this stage is the medium that has been used to sparge trays (2).

In the preferred embodiment of the second aspect of the present invention shown in FIG. 2, this stripping medium also comprises the motive steam of pump (20).

In the preferred embodiment of the second aspect of the present invention shown in FIG. 3, the stripping medium does not include the stripping medium that has been used to sparge trays (2) since this bypasses the packed column (3) through conduit (22). This latter embodiment has the advantage that volatiles removed during the third stage of the process according to the invention cannot contaminate the oil flowing down the packed column (3).

In the preferred embodiments of the second aspect of the present invention shown in FIGS. 1, 2 and 3, the stripping medium flows countercurrently to the oil that has been distributed over packed column (3) by distributor (4). To eliminate oil droplets from the vapour stream leaving packed column (3), a demister (5) can be fitted inside the shell (1) above distributor (4), as shown in FIGS. 1, 2 and 3.

FIGS. 1 and 2 show the vapour stream after passing through demister (5) being scrubbed with fatty acid distillate (FAD 2) in scrubber (6) which is a standard piece of equipment comprising a circuit (7) that feeds a distributor (8) that is situated above the scrubber (6), a collection vessel (9), a heat exchanger (10) to cool the FAD, a circulation pump (not shown) and a purge (11) that is controlled by the level in the collection vessel (9). Above the distributor (8), another demister (12) is depicted, although this is not mandatory. The connection to the vacuum system is located above the demister (12) and then, in the top of the upper part of shell (1), two heat exchange trays (13) have been fitted that ensure the final heating of the oil to operating temperature by high-pressure steam that is generated in boiler (14); thermal oil can be used instead of high-pressure steam.

A preferred embodiment of the second aspect of the present invention comprising a flash vessel (23) and re-heating in trays (13) has been represented schematically in FIG. 3.

The heat exchange elements in tray (13) can be the standard pigtails that form part of current designs. These designs also comprise some slight sparging with steam to ensure that the oil is agitated to expedite heat transfer. However, in the case of the process according to the invention, the hot oil in tray (13) will boil vigorously when exposed to a vacuum. In normal circumstances, this boiling action suffices to ensure heat transfer. However, when the apparatus is used for low-acidity oils, much less FFA will flash off at this stage so that for full versatility, sparging means have to be provided in tray (13).

The vapours resulting from the flashing stage leave shell (1), at the top from where they move to scrubber (15). In the embodiment of the second aspect of the present invention depicted in FIG. 1, scrubber (15) has been drawn as a piece of equipment in which liquid FAD is sprayed into the vapour stream. This is preferable since this type of scrubber causes a lower pressure drop than the structured packing of scrubber (6). Scrubber (15) forms part of a circuit (16) that also comprises a heat exchanger (17) to cool the condensate and a purge valve (18). Various types of condensation systems can be used in the process according to the invention. Direct systems such as the spraying type (15) or the structured packing type (6) have been found to be effective but surface condensers as plate heat exchangers, tube-and-shell condensers or finned tube condensers stacked in a kind of grid can also be used to scrub the vapours leaving the flash vessel.

The condensation in scrubber (15) can be carried out in a single stage but the embodiment in which the vapours originating from the flashing stage are fractionated in a two-stage scrubbing operation by successive condensation at increasingly lower temperatures also forms part of the invention.

In the preferred embodiment of the second aspect of the present invention depicted in FIG. 1, the low pressure above flash tray (13) and inside scrubber (15) is maintained by pump (19). This pump extracts vapours from scrubber (15) and feeds in these to shell (1) below scrubber (6) so that organic vapours that have not been condensed in the low-pressure scrubber (15) get a second chance to condense.

Alternatively as shown in the preferred embodiments of the second aspect of the present invention depicted in FIGS. 2 and 3, said pump can also feed in its compressed vapours below packed column (3). This has the advantage that the motive steam used in pump (20) in FIG. 2 and pump (21) in FIG. 3 can serve as stripping medium in packed column (3) which outweighs the disadvantage that more compression is required requiring somewhat more motive steam.

In the preferred embodiment of the second aspect of the present invention shown in FIG. 1, pump (19) has been depicted as a steam ejector but the process according to the invention is not limited to this kind of pump. Use of a mechanical pump like a Roots blower has also been found to be effective.

Oil that has been stripped in the packed column (3) moves to the third stage of the process according to the invention where it is stripped with steam in trays (2) before being cooled by heat exchange with incoming oil. The vapours leaving trays (2) move upwards, through packed column (3), demister (5), scrubber (6) and demister (12) if present, before leaving shell (1) through the connection to vacuum.

If in the preferred embodiment of the second aspect of the present invention shown in FIG. 1, the vacuum system can attain a pressure of 2 mbar, this means that, if pump (19) were not available and scrubber (15) were to be connected to circuit (7), the pressure below scrubber (6) would be about 3 mbar and because of the pressure drop over scrubber (15), the pressure above tray (13) would be slightly higher at 3.5 mbar, with the pressure below the packed column (3) being even higher at 4.5 mbar. A higher pressure at the ejector inlet would cause all values above to increase and make the stripping in trays (2) require even more stripping steam.

According to another preferred embodiment of the second aspect of the present invention, the means to maintain the pressure in said flash vessel at a value that is below the pressure prevailing above said packed column is a pump (20) that is capable of lowering the pressure above trays (2). Less stripping steam is the required in these trays. This embodiment is schematically represented in FIG. 2.

In the preferred embodiment of the second aspect of the present invention shown in FIG. 3, the vapours originating from the second, countercurrent stage and the third, crossflow stage of the process according to the invention are combined and scrubbed by successive condensation in scrubbers (6A) and (6B) at increasingly lower temperatures.

EXAMPLES

Figure 4:
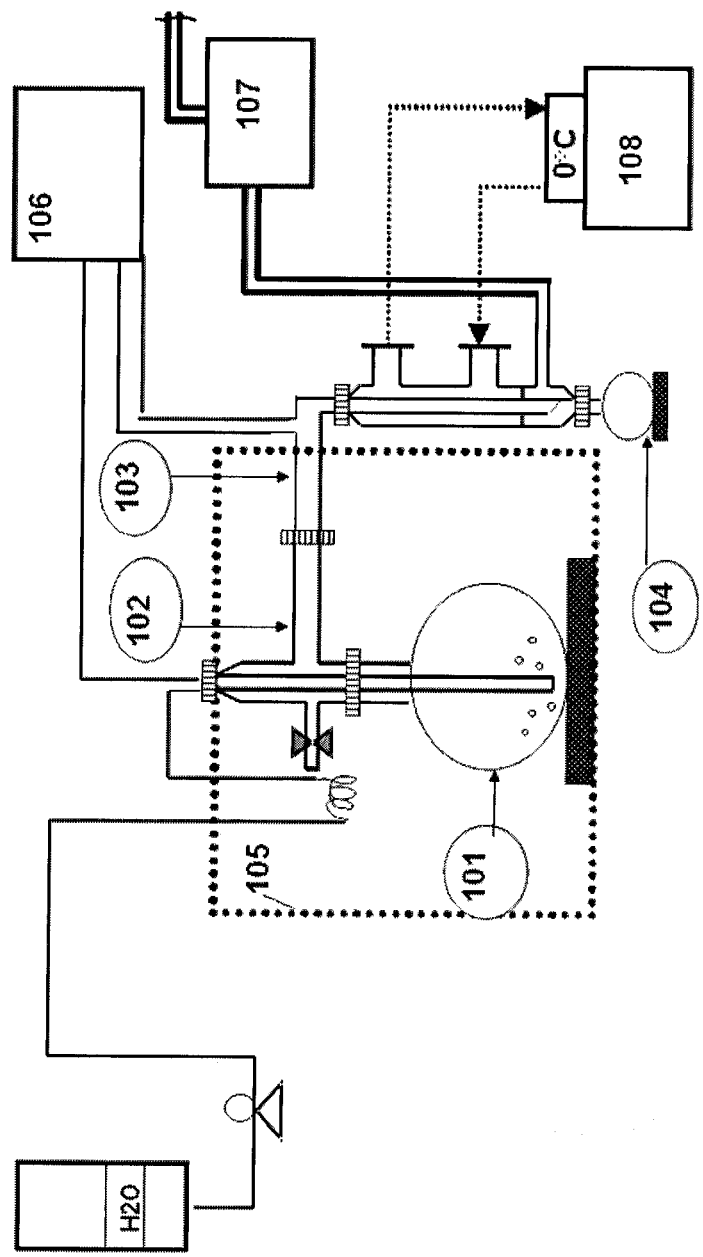
FIG. 4 is a schematic representation of a laboratory set-up where 101 is a 1 L flask, 102 indicates Pyrex® glass tubing; 103 indicates a horizontal glass tube; 104 indicates a cold trap; 105 is an oven, 106 indicates an ICP300 for monitoring temperature $T_i$ (° C.) and pressure P (mbar); 107 is a vacuum pump; and 108 is a water bath.

The experiments described in the examples were carried out in the laboratory set-up as shown in FIG. 4, where 101 is a 1 L flask, 102 indicates Pyrex® glass tubing; 103 indicates a horizontal glass tube; 104 indicates a cold trap; 105 is an oven, 106 indicates an ICP300 for monitoring temperature $T_i$ (° C.) and pressure P (mbar); 107 is a vacuum pump; and 108 is a water bath.

This figure shows a 1 L glass flask (101) which is used for the flashing and deodorising of 400 g oil samples. The flask is fitted with a glass tube that reaches almost to the bottom of the flask so that when steam ($H_2O$) is supplied through this tube it bubbles through the oil. The rate of supply is governed by a metering pump that draws water from a reservoir and feeds the water through a coil to the flask. The coil and flask are placed in an oven (105) which controls the oil temperature and causes the water to evaporate. The vapour duct is also inside the oven to prevent the vapour from condensing and refluxing back into the oil. Outside the oven the vapour is condensed in a water-cooled condenser (104) that is connected to the vacuum pump (108). The ICP 300 (106) controls the temperature $T_i$ (° C.) and pressure P (mbar).

Oil and distillate samples have been analysed for FFA content by titration and their composition has been determined by GLC. The fatty acid composition of the palm oil used in the examples allowed its mean molecular weight to be determined as 269. This is the figure used to convert the acidity as measured by titration to a weight % of free fatty acids. So whereas the official methods express the FFA content of seed oils as weight % oleic acid and the FFA content of palm oil as weight % palmitic acid, the weight percentages reported in the examples are exactly half-way in between these two values. This way of reporting has been chosen to facilitate arriving at a mass balance.

Example 1

Palm oil with 4.0% FFA by weight was deodorised with 1 wt % steam at a temperature of 260° C. at various pressures. The analytical results are given in Table 1:

TABLE 1

| System pressure [mbar] | 3 | 4 | 5 | 7 |
|---|---|---|---|---|
| FFA content of deodorised oil [wt %] | 0.016 | 0.040 | 0.037 | 0.200 |
| FFA content of distillate [wt %] | 89.73 | 93.79 | 93.60 | 93.79 |
| MG content of distillate [wt %] | 4.18 | 2.92 | 1.67 | 1.77 |
| %-age by weight of original MG in distillate | 71 | 47 | 27 | 27 |
| DG/TG weight ratio in deodorised oil | 0.054 | 0.057 | 0.056 | 0.058 |
| DG/TG weight ratio in distillate | 2.24 | 3.02 | 3.52 | 4.56 |

The data in the above table shows that, at a pressure of 7 mbar, 1 wt % of steam was insufficient to arrive at a sufficiently low residual FFA content. They also show that with increasing pressure, the monoglyceride (MG) content of the distillate decreased because a lower percentage of the monoglycerides originally present was volatilised. The diglyceride (DG) content of the oil did not changed during deodorisation and the reason that the diglycerides to triglyceride ratio in the distillate decreased with increasing pressure could be due to the fact that at low pressure, splashing is quite violent so that the diglycerides that have reached the distillate by evaporation are diluted to a greater extent by splash oil.

Example 2

In this example, the effect of the amount of stripping steam is investigated by deodorising an oil at 260° C. at 3 mbar during 1.0 hour with varying amounts of steam. The results are given in Table 2:

TABLE 2

| Amount of stripping steam [wt %] | 1.00 | 0.75 | 0.50 | 0.10 |
|---|---|---|---|---|
| FFA content of deodorised oil [wt %] | 0.016 | 0.040 | 0.055 | 0.504 |
| FFA content of distillate [wt %] | 89.74 | 91.39 | 90.21 | 97.06 |
| MG content of distillate [wt %] | 4.37 | 3.36 | 2.72 | 1.41 |
| %-age by weight of original MG in distillate | 73 | 57 | 46 | 19 |
| DG/TG weight ratio in deodorised oil | 0.054 | 0.056 | 0.058 | 0.057 |
| DG/TG weight ratio in distillate | 2.24 | 2.87 | 2.44 | 4.16 |

The data in Table 2 clearly show that using less steam increases the residual FFA content. Its impact on monoglycerides (MG) is quite pronounced in that less steam causes less MG to be evaporated. The use of only 0.1 wt % stripping steam means that this experiment was performed under conditions which are close to flashing; it leading to a residual FFA content that is close to that of good quality crude soya bean oil, a very low evaporation of monoglycerides, and a distillate with a very high FFA content. Its high DG/TG ratio indicates a low oil loss due to splashing.

Example 3

According to the Bailey equation describing the deodorisation process, operating at a lower system pressure and using more stripping medium leads to a lower residual volatile content. However, operating at a constant pressure/steam ratio should lead to the same residual volatile content. This has been checked in the present example, the results of which are given in Table 3. In addition this table provides data underlying the diglyceride mass balance in an attempt to quantify any oil hydrolysis taking place during the physical refining process.

TABLE 3

| System pressure [mbar] | 2 | 3 | 4 | 6 |
|---|---|---|---|---|
| Amount of stripping steam [wt %] | 0.50 | 0.75 | 1.00 | 1.50 |
| FFA content of deodorised oil [wt %] | 0.038 | 0.040 | 0.040 | 0.044 |
| FFA content of distillate [wt %] | 91.06 | 91.39 | 93.73 | 93.40 |
| MG content of distillate [wt %] | 3.27 | 3.36 | 2.92 | 2.69 |
| %-age by weight of original MG in distillate | 56 | 57 | 47 | 41 |
| Amount of distillate [weight % with respect to oil] | 4.35 | 4.33 | 4.22 | 4.23 |
| DG content of distillate [wt %] | 2.24 | 2.04 | 1.39 | 1.71 |
| DG content of deodorised oil [wt %] | 5.36 | 5.32 | 5.34 | 5.30 |
| Amount of diglycerides in distillate [weight %] | 0.097 | 0.088 | 0.059 | 0.072 |
| Amount of diglycerides in deodorised oil [weight %] | 5.127 | 5.004 | 5.115 | 5.076 |
| Total amount of diglycerides [weight %] | 5.224 | 5.092 | 5.173 | 5.148 |

The data in Table 3 show that, in accordance with theory, a constant ratio of system pressure to the amount of stripping steam leads to deodorisation results that are very similar. This holds for the residual FFA content of the deodorised oil and the composition of the distillate be it that its content of tocopherols and tocotrienols dropped from 0.19 wt % for the experiment carried out at 2 mbar to 0.07 wt % for the experiment carried out at the highest pressure of 6 mbar. The reason for this is unknown.

In the lower part of Table 3, the diglyceride content of the starting oil of 5.22% by weight is compared with the sum of the amounts detected in the various distillates and their corresponding deodorised oils. The amount of distillate has been calculated as follows:

$$\text{Amount of distillate} = 100[(\text{FFA}_{oil\ in} - \text{FFA}_{oil\ out})/(\text{FFA}_{FAD} - \text{FFA}_{oil\ out})]$$

The data in Table 3 clearly shows that the amount of diglycerides has remained virtually constant. This shows that if any hydrolysis were to have taken place during physical refining, it is exactly compensated by ester formation, but since it is highly unlikely that both reactions occurred to the same extent under all the various process conditions, it is much more likely that neither hydrolysis nor ester formation take place to a significant extent.

Example 4

In this example, a palm oil with 4.55% by weight FFA was subjected to flash experiments at different pressures. In the experiments, the oil samples were heated to 220° C. while under a vacuum of 50 mbar absolute. When this temperature was reached, heating was continued while the pressure was reduced to the desired value. An amount of 0.05 wt % sparging steam was also applied. The results are given in Table 4:

TABLE 4

| System pressure [mbar] | 1 | 2 | 3 | 5 |
|---|---|---|---|---|
| FFA content of deodorised oil [wt %] | 0.21 | 0.48 | 0.82 | 2.02 |
| FFA content of distillate [wt %] | 96.07 | 98.18 | 99.21 | 98.94 |
| MG content of distillate [wt %] | 3.62 | 2.07 | 1.86 | 1.60 |
| %-age by weight of original MG in distillate | 60 | 32 | 26 | 15 |

The experiments were repeated using the same oil but with the difference that no sparging steam was applied during heating/evacuation.

TABLE 5

| System pressure [mbar] | 1 | 2 | 3 | 5 |
|---|---|---|---|---|
| FFA content of deodorised oil [wt %] | 0.99 | 1.49 | 2.33 | 3.01 |
| FFA content of distillate [wt %] | 97.99 | 98.65 | 99.03 | 98.95 |
| MG content of distillate [wt %] | 3.32 | 1.79 | 1.80 | 1.29 |
| %-age by weight of original MG in distillate | 45 | 21 | 15 | 8 |

When comparing the data from Table 4 with those of Table 5, it is immediately obvious that even the small amount of 0.05 wt % sparging steam had a large effect on the residual FFA content of the oil after flashing. Whereas the residual FFA content was approximately proportional to the system pressure when a small amount of sparging steam was used, this was no longer the case when the sparging steam was omitted. It therefore appears that the use of sparging steam affected the kinetics rather than the equilibrium of the process. The steam caused a vapour stream out of the flask, and this caused the vapour/liquid equilibrium to be established more quickly.

The FFA contents of the oil samples after flashing were invariably high and their monoglyceride contents decreased with an increase in system pressure. Accordingly, the system pressure can be used in the process according to the present invention to control the monoglyceride content of the distillate.

The invention claimed is:

1. A process for the physical refining of edible oils or fats (EDOF) that have been degummed to a residual phosphorus content to below 10 ppm P, said process comprising the consecutive steps of:
    a) flash evaporating at least 60% by weight of the volatiles of said EDOF in a flash vessel;
    b) evaporating some further residual volatiles from said EDOF by passing said EDOF through a packed column and counter current steam stripping said EDOF in said packed column;
    c) evaporating further residual volatiles by passing said EDOF through a cross flow tray system; wherein the pressure during said step a) is maintained at a value below the pressure above said packed column.

2. The process according to claim 1, wherein the EDOF temperature during said step a) is between 220 and 280° C.

3. The process according to claim 1, wherein said step a) flash evaporation is carried out adiabatically by superheating the EDOF to be physically refined and passing the resulting superheated EDOF to said flash vessel.

4. The process according to claim 1, further comprising re-heating the EDOF leaving said flash vessel in heating trays before the EDOF is distributed over said packed column in said step b).

5. The process according to claim 1, wherein heat is transferred to the EDOF during said step a).

6. The process according to claim 5, wherein upper trays are disposed in said flash vessel and their heat exchange elements are used to transfer heat to the incoming EDOF and thereby control the temperature of the EDOF forwarded to said step b).

7. The process according to claim 6, wherein the heat transfer in said upper trays is promoted by supplying sparging steam to said upper trays.

8. The process according to claim 6, wherein no sparging steam is applied to said upper trays.

9. The process according to claim 1, wherein vapours produced during said step a) are fractionated by successive condensation at increasingly lower temperatures.

10. The process according to claim 1, wherein vapours produced during said steps b) and c) are fractionated by successive condensation at increasingly lower temperatures.

11. The process according to claim 1, wherein condensate from vapours resulting from said step a) is combined with condensate from vapours that result from subsequent steps.

12. The process according to claim 1, further comprising scrubbing vapours generated in the said step b) and said step c) in a scrubber and wherein a portion of condensate produced in said scrubber is at least partially recycled to the EDOF to be physically refined.

13. The process according to claim 12, wherein pressure in said flash vessel is reduced by a pump that extracts vapour from said flash vessel and feeds the extracted vapour into a shell above the packed column and below said scrubber.

14. The process according to claim 13, wherein said pump is a steam ejector.

15. The process according to claim 13, wherein said pump is a mechanical pump.

16. The process according to claim 1, wherein the pressure in said flash vessel is reduced by a steam ejector that extracts vapour from said flash vessel and forwards the extracted vapour below said packed column so that motive steam supplied to said steam ejector at least partially supplies the stripping steam used in said packed column and the stripping steam used to sparge trays in said cross flow tray system bypasses said packed column and moves directly below said scrubber.

17. The process according to claim 1, wherein the pressure in said flash vessel is reduced by a pump that extracts vapour from said flash vessel and also from the space above trays in said cross flow tray system and feeds the extracted vapour into a shell below said packed column.

18. The process according to claim 17, wherein said pump is a steam ejector so that motive steam supplied to said steam ejector at least partially supplies the stripping steam used in said packed column.

* * * * *